United States Patent [19]

Mitchell, III et al.

[11] 3,933,622

[45] Jan. 20, 1976

[54] TRIMETALLIC HYDROCARBON CONVERSION CATALYST

[75] Inventors: Howard Lee Mitchell, III; James Richard Hays, both of Baton Rouge, La.

[73] Assignee: Exxon Research and Engineering Company, Linden, N.J.

[22] Filed: Dec. 4, 1973

[21] Appl. No.: 421,515

[52] U.S. Cl. ............... 208/139; 208/138; 252/439; 252/441; 252/466 PT
[51] Int. Cl.² .................. C10G 35/08; B01J 27/06; B01J 23/68
[58] Field of Search ............ 208/139, 138; 252/441, 252/439, 466 PT

[56] References Cited
UNITED STATES PATENTS

| | | | |
|---|---|---|---|
| 2,752,289 | 6/1956 | Haensel | 208/139 |
| 3,558,479 | 1/1971 | Jacobson et al. | 208/139 |
| 3,567,625 | 3/1971 | Sinfelt et al. | 208/139 |
| 3,632,620 | 1/1972 | Kober | 252/441 |
| 3,729,408 | 4/1973 | Carter et al. | 208/138 |
| 3,770,616 | 11/1973 | Kominami et al. | 208/138 |
| 3,801,498 | 4/1974 | Rausch | 208/139 |

Primary Examiner—Delbert E. Gantz
Assistant Examiner—James W. Hellwege
Attorney, Agent, or Firm—Llewellyn A. Proctor

[57] ABSTRACT

A platinum-containing catalyst, particularly one comprising platinum, rhenium, and silver, and preferably platinum, rhenium, silver and halides, composited with a porous inorganic support material, preferably sulfided, is found useful in hydrocarbon conversion reactions, particularly reforming (hydroforming). A naphtha or straight run gasoline can be contacted with such catalyst at reforming conditions in the presence of hydrogen to improve the octane quality of the naphtha or gasoline.

29 Claims, No Drawings

TRIMETALLIC HYDROCARBON CONVERSION CATALYST

Catalytic reforming (i.e., hydroforming) is an established process in the petroleum refining industry and has been used for improving the octane quality of naphthas and straight run gasolines for many years. Catalysts used in catalytic reforming are recognized as dual-functional, perhaps more accurately polyfunctional, the catalyst composite including a component comprising a metal, or metals, or a compound or compounds thereof, providing a hydrogenation-dehydrogenation (hydrogen transfer) function, isomerization function, hydrocracking function, and/or hydrogenolysis function, and an acidic component providing isomerization, cracking, and/or hydrocracking functions.

The platinum group, or Group VIII noble metals (ruthenium, osmium, rhodium, iridium, palladium and platinum), despite their expense, have been long recognized as particularly efficient hydrogen transfer components. Platinum per se has, in fact, proven par excellence as a hydrogen transfer component and, in fact, possesses a combination of properties which makes it particularly suitable as a component for commercial reforming catalysts. Conventional reforming catalysts have thus long employed platinum composited with an inorganic oxide base, particularly alumina, to which halogen is added to supply the isomerization function. Platinum catalysts have achieved world-wide use in commercial reforming operations.

There is a desideratum in the art, occasioned in large part by the withdrawal of alkyl lead compounds based on ecological considerations, and intensive efforts are again underway to improve the octane quality of naphthas and gasolines while suppressing the use of such additives, or by elimination of such additives, and present emphasis is on the improvement of reforming catalysts. Improvements have been made, and new species of catalysts have been developed. The new family of reforming catalysts which have proven most satisfactory are largely bimetallic, and most (if not all) include platinum as an essential component. Thus, platinum yet maintains a rank of distinction as a component of commercially viable reforming catalysts. The industry, in turning to catalysts which employ bimetallic components to provide effective hydrogen transfer and dehydrocyclization for improving the octane quality of naphthas and gasolines in commercial operations, has also utilized catalysts which contain both platinum and rhenium (e.g., U.S. Pat. No. 3,415,737). While the combination of platinum and rhenium has proven effective, surpassing platinum per se as a hydrogen transfer and dehydrocyclization component for commercial reforming operations, further improvement of such catalysts is quite desirable.

Platinum-rhenium catalysts possess satisfactory activity for use in reforming operations, activity being defined as that property which imparts the ability to produce aromatics, aromatic production (or octane improvement) generally being measured as a function of temperature, feed rate, etc. Platinum-rhenium catalysts also possess satisfactory selectively which is defined as that property which imparts the ability of the catalyst to produce high yields of high octane number $C_5^+$ liquid products with concurrent low production of normally gaseous hydrocarbons, i.e., $C_1$-$C_4$ hydrocarbons, or solid carbonaceous by-products, and coke, which form on the catalysts during reforming. These catalysts also possess good stability or activity maintenance, i.e., activity plotted as a function of time, good stability or activity maintenance being defined as high retention of good activity and selectivity, or continued high activity and stability for prolonged periods during hydrocarbon conversion, or reforming operations.

While any commercially viable reforming catalyst must possess these properties to a significant degree, no catalyst used in real world operations can possess all of these properties to the ultimate degree. One of these characteristics may be possessed by a catalyst in admirable degree, but the proper quality of another of these characteristics may adversely affect the worth of the catalyst. Thus, a catalyst which possesses good selectivity does not necessarily have good activity, and vice versa. A small decrease in $C_5^+$ liquid yield can thus represent a large debit in commercial reforming operations. Conversely, the worth of a catalyst which possesses high selectivity may be jeopardized by the considerable capital cost which necessitates large charges of noble metals containing catalysts. Proper balance between these several properties is essential in the commercial world and an improvement gained in one property, or characteristic, cannot be too much offset by loss of another if the catalyst is to prove commercially viable.

While platinum-rhenium catalysts appear to possess a generally satisfactory balance between these several desirable properties, it is nonetheless desired to further improve the basic platinum-rhenium catalyst. Also, it is desirable to reduce the amount of rhenium and platinum which must be employed, since both rhenium and platinum are not plentiful metals and are quite expensive.

Accordingly, it has now been discovered that a catalyst comprising catalytically active amounts of platinum, rhenium and silver and, more preferably, platinum, rhenium, silver and halide composited with a porous inorganic base, notably alumina, is more sulfur-tolerant, more active, has greater selectivity for producing gasolines at reforming conditions and is more stable than, e.g., a catalyst otherwise similar except that it does not contain silver, or silver and halide. Moreover, the activity of such catalysts closely approximates, or approaches, that of platinum and rhenium-containing catalysts otherwise similar except that they contain higher amounts of rhenium and platinum. A preferred catalyst composition of such character comprises from about 0.05 to about 3 percent platinum, preferably from about 0.1 to about 1 percent platinum, from about 0.05 to about 3 percent rhenium, preferably from about 0.1 to about 1 percent rhenium, and from about 0.005 to about 5 percent, preferably from about 0.1 to about 0.7 percent, and more preferably from about 0.2 to about 0.5 percent of silver, based on the total weight (dry basis) of the composition. Preferably, also, the sum total of the silver and rhenium contained in such catalyst compositions ranges from about 0.3 to about 1 percent, and more preferably from about 0.45 to about 0.70, based on the weight (dry basis) of the total catalyst compositions. In the more preferred compositions, the atom ratio of rhenium:silver ranges from about 10:1 to about 1:12, and preferably from about 1:1 to about 1:5, whereas the atom ratio of the platinum:rhenium ranges from about 0.25:1 to about 5:1, and preferably from about 1:1 to about 2:1. The absolute concentration of the metals used, particularly the rhenium and silver, has a relationship to the atom ratios employed, to the nature of the base employed and to the nature of the feed and the amount of sulfur, nitrogen, and oxygen, phosphorus and various other Group VA and VIA elements (Periodic Table of the Elements, E. H. Sargent & Co., copyright 1962, Dyna-Slide Co.) contained in the feed.

The preferred catalyst of this invention not only includes platinum, rhenium and silver, but also halogen, preferably in relatively high concentration. In the preferred halogen-containing species, the halogen is combined with the silver such that it is believed that at least a portion of the latter metal exists as a halide salt rather than as a reduced form of silver, thus providing better catalyst stability as contrasted with conventional catalysts wherein all or most of the metals are in reduced form, and a larger proportion of the halogen more easily lost during reforming operations. The catalyst compositions, in any event, initially contain from about 0.1 to about 25 percent halogen, preferably from about 0.5 to about 2.5 percent halogen. The catalysts, preferably, also contain sulfur suitably from about 0.001 to about 2 percent, and preferably from about 0.001 to about 0.15 percent sulfur, based on the total weight (dry basis) of the catalyst compositions. Such catalysts, at optimum conditions, possess significantly greater activity, activity maintenance, and improved selectivity even as compared with catalysts otherwise similar which contain equal or greater amounts of platinum and rhenium, but no silver or silver halide. In the preferred combinations at optimum conditions, the activity of the catalyst is considerably more active than (almost twice that of) conventional platinum-rhenium reforming catalysts run at optimum conditions. Because of the greatly increased activity, in terms of rhenium and platinum effectiveness, this permits the use of a less expensive and more available metal, i.e., silver in lieu of part of the rhenium and platinum. These catalysts, at optimum sulfur levels, also possess enhanced selectivity, providing increased $C_5^+$ liquid yields as contrasted with a catalyst otherwise similar except that it does not contain silver, the latter having been run at optimum conditions. These platinum-rhenium-silver (or platinum-rhenium-silver halide) catalysts are far more tolerant to sulfur than catalysts otherwise similar except that they contain no silver.

Halogen in excess of what is required for activation is added to the catalyst during preparation, this providing better dispersement of metals and assurance that the metals are in their desired form. In a reforming operation, much of the halogen originally added is progressively stripped from the catalyst and hence, quite early during the run, but particularly after an extended period, the catalyst, despite its relatively high stability, contains less halogen than was originally added. In the initial portion of an operating run, the halogen concentration is relatively rapidly diminished and thereafter tends to stabilize, the halogen being lost at a decreasing rate. In the initial preparation of these catalysts, it is preferred to incorporate sufficient halogen to provide a molar ratio of halogen:silver ranging from about 3:1 to about 30:1, and preferably from about 10:1 to about 20:1. These catalysts, after stabilization during a reforming operation, generally contain halogen and silver in molar ratio of halogen:silver ranging from about 1:1 to about 20:1, and preferably from about 5:1 to about 15:1. In the preparation of catalysts containing the more preferred, or optimum, concentration of silver, the halogen:silver ratio generally ranges from about 12:1 to about 18:1, and after stabilization from about 4:1 to about 12:1. In terms of weight concentration of halogen, such catalysts generally contain from about 0.3 to about 1.5 percent, and more generally from about 0.5 to about 1 percent halogen, based on the weight (dry basis) of the total catalyst composition. Because of the high affinity of the halide for silver, which is believed to form the silver halide at least in part under the conditions normally used, the higher the concentration of silver the greater the concentration of the halide retained by the catalyst during an operating run.

The catalysts of this invention are particularly suitable for use alone or in admixture with other catalysts, and can be used in one or more of the several stages (or reaction zones) of a multiple stage reforming process, i.e., one wherein a series of reactors is provided with beds of catalysts, the beds of which are serially contacted with preheated feed. They are particularly effective for the treatment of paraffinic feeds, or feeds which are difficult to reform, particularly at severe operating conditions, or at conditions for producing very high octanes, and more particularly octanes in excess of 100 RON and yet more particularly octanes in excess of 102 RON. They are also particularly effective in treating high sulfur feeds, and have shown outstanding activity and selectivity in the treatment of feeds containing 10 ppm sulfur, and higher, i.e., at conditions wherein a catalyst otherwise similar but not containing silver, or silver halide, shows greatly reduced activity. The catalysts are quite suitable in reactors following the first reactor of the series. In a preferred process of this type, fixed beds of the catalysts are contained in individual reactors (or reaction zones), the naphtha feed is reheated in inter-stage reheater furnaces to reforming temperatures and, with hydrogen, is passed sequentially through the several reactors of the series. The vapor effluent from the last reactor of the series, a gas rich in hydrogen which usually contains small amounts of gaseous hydrocarbons, is separated from the $C_5^+$ liquid product and recycled to the process to inhibit coke formation on the catalyst. Hydrogen is produced in net amount in the reaction, which is a particular advantage in modern refinery operations.

In the practice of this invention, the metals are composited with a support material, suitably mildly or moderately acidic refractory inorganic oxides, e.g., silica, silica-alumina, magnesia, thoria, boria, titania, zirconia, various spinels and the like, including, in particular, alumina, and more particularly gamma alumina, which species are preferred. Other supports include halides, oxy halides, mixed halides and the like. High surface area catalysts, or catalysts having surface areas ranging upwardly from about 10, and preferably 100 $M^2/g$. (B.E.T.) are preferred. In particular, catalysts having surface areas ranging from about 150 to about 600 $M^2/g$. prove quite satisfactory.

The platinum, rhenium, silver, and silver halide components can be composited or intimately associated with the porous inorganic oxide support or other carrier by various techniques known to the art such as ion-exchange, coprecipitation, or physical mixing of fine particles with the alumina in the sol or gel form, etc. For example, the catalyst composite can be formed by adding together suitable reagents such as water soluble salts of platinum, rhenium, and/or silver, and ammonium hydroxide or ammonium carbonate, and a salt of aluminum such as aluminum nitrate, aluminum sec-butoxide, or aluminum sulfate to form aluminum hydroxide. When the metals are included in the preparation of the support, higher concentrations of the metals, particularly of silver, are often necessary. The aluminum hydroxide containing the salts of platinum, rhenium, and silver can then be heated, dried, formed into pellets or extruded, and then calcined in nitrogen or nonagglomerating atmosphere. The platinum or rhenium, or both, can be added to the support, and then the silver added. Or the silver can be added, and then the platinum and rhenium added together, or in sequence. The silver, in the preferred preparation, is usually added first to the catalyst base by impregnation typically via an "incipient wetness" technique which requires a minimum of solution so that the total solution is absorbed, initially or after some evaporation, or by adsorption from dilute or concentrated solution. The catalyst is then dried and the other required metals are then added in a second impregnation step. Calcination between these steps is not necessary, as is the case in most dual impregnation catalyst preparations. Suitably, platinum, rhenium, and halogen are added simultaneously and the catalyst then dried. On the other hand, if the silver, platinum, and rhenium have already been added as by coprecipitation from an alumina gel, the halide can be subsequently added, e.g., by impregnation from an aqueous HCl solution, or by gas phase chlorination with an $HCl-Cl_2$ mixture or other halide precursor. The material is then calcined in a nonagglomerating atmosphere and then hydrogen treated, or hydrogen sulfide treated, or both, in situ or ex situ, to reduce the salts and complete the formation of the catalyst composite.

Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent evaporation to effect total uptake of liquid. The catalyst is then dried and, if smaller particles are desired, then crushed to form particles of the desired size ranging, e.g., from about 5 to about 200 mesh (Tyler series), and preferably particles of about 1/10 to about 1/50 inch average diameter can be used. The support material can be treated by contact with a single solution containing the desired amounts of platinum, rhenium, and silver, or treated sequentially by contact with a solution containing one or more metals, and then a solution which contains another metal, or metals, in the desired amounts. Preferably, the silver is first added to the support, and then the platinum and rhenium are simultaneously added, suitably along with the desired halide. The catalyst from any preparative sequence can then be dried, calcined in a nonagglomerating atmosphere and contacted with hydrogen, or hydrogen sulfide, or both, in situ or ex situ, to reduce part or all of the metal salts and activate the catalyst.

It is particularly desirable, and preferred, to incorporate an acidic or isomerization component within the catalyst composite, subsequent to the addition of the silver, so that the insoluble silver halide is formed on the catalyst surface rather than as a precipitate from the solution. It is more preferred to incorporate the acidic or isomerization function within the catalyst by addition of halide, e.g., fluoride, chloride, bromide, iodide, and the like, particularly chloride or fluoride, more preferably chloride. This controls the rate of isomerization and cracking. This is conveniently and preferably done, partially or entirely, after incorporation of the silver, and during the time of incorporation of the other metals onto the support, or less preferably subsequent to addition of all of the metals to the support. The metals thus can be added as halide salts of platinum and/or rhenium, after addition of the silver, during preparation of these catalysts.

The partially dried catalyst, after incorporation of the metals, and halogen, is then completely dried or calcined in nitrogen or other non-agglomerating medium, either in situ or ex situ, as related to the reactor in which the naphtha reforming reaction is to be carried out. The general method is to carry out the drying in flowing nitrogen while raising the temperature stepwise to avoid too high a concentration of water vapor. The temperature is not critical, but is generally increased to 800°–1000°F. and the gas flow maintained until the catalyst is essentially completely dry. At this stage (or after the reduction, or during sulfiding), if it is desired to raise the halide concentration of the catalyst further, halogen, halogen halide or halide precursor can be contacted with the catalyst in gaseous form, in situ or ex situ. It is very important that the catalyst be essentially dry before it is reduced or contacted with hydrogen in order to avoid metals agglomeration. The catalyst is then reduced, generally with hydrogen or a hydrogen-containing gas, the platinum being reduced, or partially reduced to the metallic state, and the rhenium being partially reduced, but not necessarily to the metallic state, before the catalyst is subjected to reforming conditions. The reduction is generally carried out by passing the hydrogen through the zone of contact with the catalyst at sufficient velocity to rapidly sweep out the water vapor that is formed. The temperature of reduction is not especially critical, but is generally carried out in the range of about 500° to about 1,000°F. The time required for reduction of the noble metals is generally short and not more than an hour, or at least no more than 1 to 4 hours is generally required to complete the reduction.

Following the reduction, the catalyst is sulfided by contact with a sulfide, generally hydrogen sulfide or compound which will produce hydrogen sulfide in situ. The sulfiding step is particularly desirable inasmuch as sulfiding can improve the activity and selectivity of the catalyst significantly. The contact of a hydrogen sulfide-containing gas with the catalyst serves a number of functions, and has a profound influence on the reforming performance of the catalyst. In sulfiding the catalyst, the catalyst is contacted with a dilute gaseous solution, e.g., about 50 to about 5,000 ppm, preferably about 1,000 to about 3,000 ppm, of hydrogen sulfide in hydrogen, or hydrogen plus other nonreactive gases. The contacting of the catalyst with this gas is conducted at about 500° to about 1000°F., preferably from about 700°F. to about 950°F., and is continued until hydrogen sulfide is detected in the effluent gas. Such treatment incorporates from about 0.001 to about 2 weight percent, and preferably from about 0.01 to about 0.15 weight percent sulfur on the catalyst.

Essentially any hydrocarbon fraction containing paraffins, naphthenes, and the like, admixed one with the other or in admixture with other hydrocarbons, can be converted by means of the catalysts of this invention. A suitable feed, e.g., either virgin or cracked, Fischer-Tropsch or mixtures thereof, is contacted at reforming conditions in the presence of hydrogen (once-through, or recycle) with a catalyst composite including a support which contains catalytically active amounts of the metals. Typical feed stream hydrocarbon molecules are those containing from about 5 to about 12 carbon atoms, or more preferably from about 6 to about 12 carbon atoms, or more preferably from about 7 to about 10 carbon atoms. Naphthas, or petroleum fractions, boiling within the range of from about 80°F. to about 450°F., and preferably from about 125°F. to about 375°F., contain hydrocarbons or carbon numbers within these ranges. Typical fractions thus usually contain from about 20 to about 80 volume percent of paraffins, both normal and branched, which fall in the range of about $C_5$ to $C_{12}$, and from about 20 to about 80 volume percent of naphthenes boiling within the range of about $C_6$ to $C_{12}$. Typical feeds generally contain from about 5 through about 20 volume percent of aromatics which boil within the range of about $C_6$ to $C_{12}$, typically as produced in the product from the naphthenes and paraffins.

It is essential, for best results, that the feed contain sulfur. Preferably, the feed shall contain from about 0.1 to about 1000 parts, per million parts of feed (ppm), and more preferably from about 2 to about 50 ppm of sulfur. The manner of addition of sulfur to the feed is not critical, sulfur generally being added intermittently or continuously into the feed, or in the recycle gas, or both, generally as hydrogen sulfide or precursor thereof.

The reforming reaction, because of the high activity of the catalyst, can be conducted at temperatures somewhat lower than is required with conventional catalysts. Suitably, however, the reaction is conducted at temperatures ranging from about 600° to about 1050°F., and preferably at temperatures ranging from about 800° to about 1,000°F. Pressures range generally from about 50 to about 750 psig, and preferably from about 100 to about 500 psig. The reactions are conducted in the presence of hydrogen to suppress side reactions normally leading to the formation of unsaturated carbonaceous residues, or coke, which deposits upon and causes deactivation of the catalyst. The hydrogen rate, oncethrough or recycle, is generally within the range of from about 1,000 to about 10,000 SCF/Bbl, and preferably within the range of from about 2,000 to about 7,000 SCF/Bbl. The feed stream, in admixture with hydrogen, is passed over beds of the catalyst at space velocities ranging from about 0.1 to about 25 W/W/Hr., and preferably from about 0.5 to about 7.0 W/W/Hr.

The invention will be more fully understood by reference to the following selected nonlimiting examples and comparative data which illustrate its more salient features. All parts are given in terms of weight except as otherwise specified.

Several catalysts were prepared for demonstrative purposes from portions of particulate alumina of the type conventionally used in the manufacture of commercial reforming catalysts. The portions of alumina were impregnated with a solution of salts of the metals to be composited therewith, treated and activated and then employed as catalysts in a series of representative reforming reactions. The portions of alumina, except in the instance wherein a bimetallic platinum-rhenium catalyst (Catalyst A) was prepared and employed as a control for comparative purposes, were impregnated with aqueous acid solutions containing a mixture of water soluble salts of platinum, rhenium and halide, in a subsequent step to that in which silver had been added in an initial impregnation step (Catalysts B and C). The platinum-rhenium catalyst (Catalyst A) was prepared in identical fashion to Catalysts B and C, except that the silver impregnation step was omitted.

These catalysts were each evaluated in a continuously operated reactor for reforming naphtha at essentially the same conditions of temperature, pressure and hydrogen rate. The space velocity of the several reactions was varied, as identified in the tabulated data. The data related to catalyst preparation, and naphtha reforming, are given below, the data on catalyst preparations being given in the examples and demonstrations immediately following.

EXAMPLES

CATALYST PREPARATIONS

Catalyst A (Platinum-Rhenium)

A portion of high purity gamma alumina extrudates, previously calcined, was crushed and screened to 14–35 mesh (Tyler), then calcined about 2 hours in a flow of air or nitrogen at 1,000°F. The calcined alumina (50.00 gms) was impregnated with a solution prepared by mixing 6.00 ml. Pt stock solution of chloroplatinic acid (25.0 mg Pt/ml and 27.3 mg Cl/ml), 2.89 ml Re stock solution of perrhenic acid (52 mg Re/ml) and 8.23 ml of hydrochloric acid stock solution (48.6 mg Cl/ml) are admixed and diluted to approximately 65 ml with deionized water. After allowing the solution to stand for a period of one hour, by which time the remaining solution, if any, was colorless, the catalyst was dried in the vacuum oven to about 400°F. The catalyst was then charged to a resistance heated Vycor tube and heated at 950°–1000°F. in a flow of nitrogen for 3 hours and was then reduced in hydrogen at 900°–910°F. for 2 hours. The catalyst was then sulfided by treatment with a flowing hydrogen-$H_2S$ mixture (0.3 percent $H_2S$) which was further diluted with hydrogen and nitrogen. This was done at 900°–910°F. until $H_2S$ broke through the bottom of the bed and was detected with moist lead acetate paper.

The composition of this Catalyst A is as follows:

Pt, 0.3 percent; Re, 0.3 percent; Cl, 0.90 percent; S, 0.08 percent.

Catalyst B (Platinum-Rhenium-Silver)

A portion of high purity gamma alumina extrudates, previously calcined, was crushed and screened to 14/35 mesh (Tyler), then calcined about 2 hours in a flow of air or nitrogen at 1000°F. The calcined alumina (50.00 gms) was impregnated with a solution prepared by dissolving 0.236 gms of reagent silver nitrate in about 65 ml of distilled water. After allowing the solution to stand for a period of one hour, the remaining solution was evaporated and the catalyst dried in a vacuum oven to about 400°F. The catalyst was then impregnated with a solution prepared by mixing 6.00 ml Pt stock solution of chloroplatinic acid (25.0 mg Pt/ml and 27.3 mg Cl/ml) and 2.89 ml Re stock solution of perrhenic acid (52 mg Re/ml) and 13.09 ml of hydrochloric acid stock solution (48.6 mg Cl/ml) diluted to 65 ml with distilled water. After allowing the solution to stand for a period of 2 hours, by which time the remaining solution was colorless, the catalyst was dried, calcined, and sulfided as in the preparation of Catalyst A.

The composition of the catalyst is as follows:

Pt, 0.3 percent; Re, 0.3 percent; Ag, 0.3 percent; Cl, 0.95 percent; S, 0.1 percent.

Catalyst C (Platinum-Rhenium-Silver)

The preparation of Catalyst C was identical to that of Catalyst B except that the 1/16 inch alumina extrudates were not crushed and sieved. Thus, the final form of the Catalyst C was that of 1/16 inch extrudates, while Catalyst B was 14/35 mesh particles.

The composition of Catalyst C is as follows:

Pt, 0.3 percent; Re, 0.3 percent; Ag, 0.3 percent; Cl, 0.98 percent; S, 0.12 percent.

REFORMING RUNS

These several catalysts, after their preparation, were allowed to cool under nitrogen at low flow rate, handled under nitrogen, and stored under nitrogen and/or purified and dried hydrocarbon, generally normal heptane. Each was subsequently evaluated in extended reforming tests in a small continuous flow, once-through, or non-cyclic, reactor with a typical highly paraffinic Aramco feed. The inspections on the feed are as presented in Table 1, as follows:

TABLE I

|  | Aramco Feed |
|---|---|
| API Gravity | 60.2 |
| Octane, RON | 40.0 |
| Total Aromatics (Wt.) | 15.1 |
| Total Naphthenes (Wt.) | 22.6 |
| Total Paraffins (Wt.) | 62.7 |
| Distillation (ASTM-D86) |  |
| IBP, °F. | 212 |
| 5% | 232 |
| 10 | 236 |
| 20 | 244 |
| 30 | 251 |
| 40 | 260 |
| 50 | 269 |
| 60 | 279 |
| 70 | 290 |
| 80 | 302 |
| 90 | 315 |
| 95 | 325 |
| FBP, °F. | 381 |

A series of reforming runs, as shown by reference to Tables 2, 3 and 4, were conducted with each of these several catalysts, Catalyst A being employed as a reference for determination of the effectiveness of the novel catalysts of this invention which employ the triumvirate of metals, viz., platinum, rhenium and silver (Catalysts B and C). Catalyst A was employed to reform the feed to which was added 1.0 ppm of sulfur, this concentration of sulfur being about optimum for the platinum-rhenium catalyst. Catalysts B and C were also used to reform the Aramco feed at generally optimum conditions, the feed in these instances containing 10.0 ppm added sulfur. These catalysts, both of which contain platinum, rhenium and silver, differ one from another only in that Catalyst B is sieved to 14/35 mesh (Tyler) particle size, and Catalyst C is in the form of 1/16 inch extrudates.

Each of the reforming tests was conducted at conditions, inclusive of the following:

| Hydrocarbon Feed | Aramco Naphtha |
|---|---|
| Sandbath Temperature, °F. | 925 (Isothermal) |
| Pressure, Psi | (920°F., E.I.T.)[1] 200 |
| Hydrogen Recycle Rate, SCF/B | 4800 |
| Hydrocarbon Feed Space Velocity | 2.1–2.2 |

[1]Equivalent Isothermal Temperature of catalyst bed.

The feed sulfur levels, which were varied in the several runs, are given in the data tabulated below, along with the results obtained for the individual runs, this including for the individual runs the catalyst age, in hours, the $C_5^+$ Product Yield (volume percent) and the analyzed Aromatics Concentration in the $C_5^+$ Product (volume percent), the latter being given along with the calculated approximate Research Octane Number (RON).

TABLE 2

Catalyst A: 0.3% Pt; 0.3% Re; 0.9% Cl; 0.08% S
Run Conditions: Aramco Naphtha at 1.0 ppm S

| Hours on Feed (End of Balance) | $C_5^+$ Product Yield (Volume %) | Aromatics $C_5^+$ Product (Volume %) | Calculated RON |
|---|---|---|---|
| 22.8 | 69.9 | 67.0 | 100.8 |
| 29.8 | 69.9 | 64.5 | 99.8 |
| 47.8 | 71.2 | 60.9 | 98.4 |
| 54.8 | 70.4 | 63.1 | 99.2 |
| 126.8 | 72.5 | 58.8 | 97.5 |
| 143.8 | 73.0 | 58.1 | 97.2 |
| 150.8 | 73.2 | 56.9 | 96.7 |
| 167.8 | 73.9 | 57.1 | 96.8 |
| 174.8 | 74.6 | 56.4 | 96.5 |
| 191.8 | 74.3 | 56.4 | 96.5 |
| 198.8 | 74.9 | 54.7 | 95.8 |
| 215.8 | 74.4 | 55.8 | 96.3 |
| 222.8 | 75.2 | 54.8 | 95.9 |
| 294.8 | 76.8 | 51.4 | 94.5 |
| 311.8 | 77.1 | 51.1 | 94.4 |
| 318.8 | 77.5 | 49.5 | 93.7 |
| 335.8 | 77.8 | 49.2 | 93.6 |
| 342.8 | 76.8 | 52.0 | 94.8 |
| 359.8 | 77.4 | 50.9 | 94.3 |
| 366.8 | 77.4 | 51.1 | 94.4 |
| 383.8 | 77.6 | 55.3 | 96.1 |
| 370.8 | 77.5 | 50.9 | 94.3 |
| 462.8 | 78.6 | 49.2 | 93.6 |
| 479.8 | 78.9 | 49.9 | 93.9 |
| 486.8 | 77.9 | 51.3 | 94.4 |

TABLE 3

Catalyst B: 0.3% Pt; 0.3% Re; 0.3% Ag; 0.90% Cl; 0.1% S
Form: 14/35 mesh.
Run Conditions: Aramco Naphtha at 10.0 ppm S

| Hours on Feed (End of Balance) | $C_5^+$ Product Yield (Volume %) | Aromatics $C_5^+$ Product (Volume %) | Calculated RON |
|---|---|---|---|
| 25.3 | 64.5 | 65.6 | 100.2 |
| 49.3 | 64.4 | 66.5 | 100.6 |
| 145.3 | 66.5 | 59.8 | 97.9 |
| 169.3 | 66.0 | 62.9 | 99.1 |
| 193.3 | 66.0 | 62.3 | 98.9 |
| 217.3 | 66.2 | 61.8 | 98.7 |
| 289.3 | 68.6 | 60.6 | 98.2 |
| 313.3 | 67.9 | 60.8 | 98.3 |
| 332.3 | 68.6 | 60.2 | 98.1 |
| 364.3 | 68.8 | 62.4 | 99.0 |
| 388.3 | 69.0 | 57.9 | 97.1 |
| 460.3 | 70.1 | 57.3 | 96.9 |
| 494.3 | 70.7 | 57.2 | 96.8 |
| 508.3 | 71.0 | 57.3 | 96.9 |

TABLE 4

Catalyst C: 0.3% Pt; 0.3% Re; 0.3% Ag; 0.95% Cl; 0.12% S
Form: 1/16" extrudate.
Run Conditions: Aramco Naphtha at 10.0 ppm S

| Hours on Feed (End of Balance) | $C_5^+$ Product Yield (Volume %) | Aromatics $C_5^+$ Product (Volume %) | Calculated RON |
|---|---|---|---|
| 23.7 | 64.2 | 68.8 | 101.5 |
| 47.7 | 68.1 | 65.6 | 100.2 |
| 119.7 | 68.6 | 66.9 | 100.8 |
| 143.7 | 72.6 | 61.3 | 98.5 |

TABLE 4-continued

Catalyst C: 0.3% Pt; 0.3% Re; 0.3% Ag; 0.95% Cl; 0.12% S
Form: 1/16" extrudate.
Run Conditions: Aramco Naphtha at 10.0 ppm S

| Hours on Feed (End of Balance) | $C_5^+$ Product Yield (Volume %) | Aromatics $C_5^+$ Product (Volume %) | Calculated RON |
|---|---|---|---|
| 167.7 | 70.4 | 61.1 | 98.4 |

When the results of running Catalyst A at its generally optimum conditions, as given in Table 2, are compared with those for Catalysts B and C as given in Tables 3 and 4, it is immediately obvious that Catalysts B and C are much more active; in fact, roughly twice as active ad Catalyst A. Moreover, the activity maintenance of Catalyst B and C is considerably improved as contrasted with that of Catalyst A. Furthermore, the generally optimum conditions of Catalysts B and C wherein a feed containing approximately 10 ppm sulfur is used contrasts strongly with the generally optimum conditions for Catalyst A which requires a feed S level generally in the range of 1 ppm. Indeed, the running of Catalyst A under identical conditions, including the 10 ppm feed S level, to the runs reported in Tables 3 and 4, where catalysts B and C excel, shows that the activity of Catalyst A is so abysmally low that valid numerical comparisons are essentially impossible. Thus, the feed sulfur tolerance of the Catalysts B and C is well established and is one of the prime features of significance resulting from the inclusion of silver or silver and halogen in the reforming catalyst. It will further be seen by comparison of Tables 2 and 4 that Catalyst C, besides showing enhanced activity, activity maintenance, and sulfur tolerance, shows improved selectivity as well, providing an approximately 4 percent $C_5^+$ yield advantage over Catalyst A at the high octane levels of severity.

It is essential that the catalyst composition of this invention contain the triumvirate of metals—viz., platinum, rhenium and silver, deposited or otherwise incorporated, preferably impregnated, upon a porous inorganic oxide base in catalytically active concentrations. The catalytically active metals can be present, e.g., as metallic metal, or as oxides, chlorides, oxychlorides, aluminates, carbides, hydrides, or sulfides of the metal, or as mixtures thereof with these and other less readily describable structures. Under the varying conditions of forming and using the catalysts, it is likely that the metals will vary in their actual distribution as oxides, chlorides, oxychlorides, aluminates, carbides, hydrides, sulfides, or reduced forms of the metals, or mixtures thereof with these and other less readily describable structures. The metals, however, are calculated on the basis of metallic metal. The catalytically active metals are composited with the porous inorganic oxide bases by methods known to the art. Preferably, the silver is impregnated on the support by contact with a solution containing a silver salt, and the so-formed composite is dried at conditions ranging from about 200° to about 400°F., often at reduced pressure, or in a stream of flowing gas. The resulting composite is then preferably impregnated by contacting with an acid solution, or solutions, containing the other metals, i.e., platinum and rhenium, and the resulting composite similarly dried, and then further dried and calcined at temperatures ranging up to about 1,200°F. in an atmosphere which does not agglomerate the metals. The catalyst then may be contacted in situ or ex situ with halogen precursor, halide or halide precursor. Halogen, preferably chlorine, and next in preference fluorine, is generally added at the time of catalyst preparation as the acid in the metals impregnation solution. Additional halogen can be added during reforming operations to maintain desired operating levels. Suitably, a hydrogen halide, or halide precursor, e.g., an organic or inorganic halide, can be added to the feed as a means of replenishing catalyst halide level or holding it at some desired level above the level obtained with no halide added in the feed. It is preferred that the halide concentration in the feed be in the range of about 0.01 ppm to about 1,000 ppm, and more preferably in the range of from about 0.1 ppm to about 10 ppm halide, depending on the feed rate employed. The catalyst is then sulfided, generally by contact with $H_2S$ in dilute gaseous mixture to convert at least some of the metals to the corresponding sulfides. As with the halides, the feeds can be spiked with sulfur compounds, or other higher sulfur feed, to add sulfide to the catalyst during operation. $H_2S$, HCl, or other gases containing sulfur or halogen can also be added to the recycle gas streams to change catalyst sulfur and halide levels during operation.

It is apparent that various modifications and changes can be made without departing the spirit and scope of the present invention, an outstanding feature of which is that the octane quality of various hydrocarbon feedstocks, inclusive particularly of paraffinic feedstocks, can be upgraded and improved.

Having described the invention, what is claimed is:

1. A catalyst suitable for conversion of hydrocarbons consisting essentially of a composite of a porous inorganic oxide support, platinum in concentration ranging from about 0.05 to about 3 percent, rhenium in concentration ranging from about 0.05 to about 3 percent, and silver in concentration ranging from about 0.005 to about 5 percent, based on the total weight of the catalyst.

2. The catalyst of claim 1 wherein the composite comprises from about 0.1 to about 1.0 percent platinum, from about 0.1 to about 1.0 percent rhenium, and from about 0.1 to about 0.7 percent silver.

3. The catalyst of claim 2 wherein the silver ranges from about 0.2 to about 0.5 percent.

4. The catalyst of claim 1 wherein the composite comprises from about 0.1 to about 25 percent halogen.

5. The catalyst of claim 4 wherein the halogen is chlorine.

6. The catalyst of claim 1 wherein the composite contains from about 0.5 to about 2.5 percent halogen.

7. The catalyst of claim 1 wherein the porous inorganic oxide support is alumina.

8. The catalyst of claim 1 wherein the composite contains from about 0.001 to about 2 percent sulfur.

9. The catalyst of claim 1 wherein the composite contains from about 0.01 to about 0.15 percent sulfur.

10. A reforming catalyst consisting essentially of a composite of alumina, platinum in concentration ranging from about 0.1 to about 1 percent, rhenium in concentration ranging from about 0.1 to about 1 percent, silver in concentration ranging from about 0.005 to about 5 percent, chlorine in concentration ranging from about 0.3 to about 1.5 percent, and sulfur in concentration ranging from about 0.001 to about 2 percent, based on the total weight of the catalyst.

11. The composition of claim 10 wherein the silver ranges from about 0.1 to about 0.7 percent.

12. The catalyst of claim 10 wherein the alumina is gamma alumina, and the sum total concentration of the platinum and rhenium ranges from about 0.3 to about 1 percent.

13. The catalyst of claim 10 wherein the sum total amount of platinum and rhenium ranges from about 0.3 to about 1 percent, and the atom ratio of the rhenium:silver ranges from about 10:1 to about 1:12.

14. The catalyst of claim 10 wherein the sum total amount of platinum and rhenium ranges from about 0.45 to about 0.70 percent, and the atom ratio of the rhenium:silver ranges from about 1:1 to about 1:5.

15. The catalyst of claim 10 wherein the sum total amount of platinum and rhenium ranges from about 0.3 to about 1 percent, and the atom ratio of the platinum:rhenium ranges from about 0.25:1 to about 5:1.

16. The catalyst of claim 10 wherein the sum total amount of platinum and rhenium ranges from about 0.45 to about 0.70 percent, and the atom ratio of the platinum:rhenium ranges from about 1:1 to about 2:1.

17. A process for improving the octane quality of naphthas comprising contacting the said naphtha at reforming conditions with a catalyst consisting essentially of a porous inorganic oxide support, platinum in concentration ranging from about 0.05 to about 3 percent, rhenium in concentration ranging from about 0.05 to about 3 percent, and silver in concentration ranging from about 0.005 to about 5 percent, based on the total weight of the catalyst.

18. The process of claim 17 wherein the silver ranges from about 0.1 to about 0.7 percent.

19. The process of claim 17 wherein the silver ranges from about 0.2 to about 0.5 percent.

20. The process of claim 17 wherein the catalyst composite comprises from about 0.1 to about 1.0 percent platinum, from about 0.1 to about 1.0 percent rhenium and from about 0.1 to about 0.7 percent silver.

21. The process of claim 20 wherein the sum total concentration of platinum and rhenium ranges from about 0.3 to about 1 percent.

22. The process of claim 17 wherein the composite comprises from about 0.1 to about 25 percent halogen.

23. The process of claim 17 wherein the composite comprises from about 0.5 to about 2.5 percent halogen.

24. The process of claim 23 wherein the halogen is chlorine.

25. The process of claim 17 wherein the porous inorganic oxide support is alumina.

26. The process of claim 17 wherein the catalyst contains from about 0.001 to about 2 percent sulfur.

27. The process of claim 26 wherein the catalyst contains from about 0.01 to about 0.15 percent sulfur.

28. The process of claim 17 wherein reforming is conducted at temperatures ranging from about 600°F. to about 1050°F., at pressures ranging from about 50 psig to about 750 psig, at space velocities ranging from about 0.1 to about 25 W/Hr./W, and at hydrogen rates ranging from about 1000 to about 10,000 SCF/Bbl.

29. The process of claim 28 wherein temperatures range from about 850°F. to about 1000°F., pressures range from about 100 psig to about 250 psig, space velocities range from about 0.5 to about 7.0 W/W/Hr., and the hydrogen rate ranges from about 2000 to about 7000 SCF/Bbl.

* * * * *